United States Patent [19]
Puna

[11] 4,131,145
[45] Dec. 26, 1978

[54] TREE CUTTING DEVICE

[75] Inventor: Erich Puna, Gävle, Sweden

[73] Assignee: Brundell och Jonsson AB, Gävle, Sweden

[21] Appl. No.: 823,735

[22] Filed: Aug. 11, 1977

[30] Foreign Application Priority Data

Jul. 1, 1977 [SE] Sweden .............................. 7707674

[51] Int. Cl.$^2$ ............................................ A01G 23/08
[52] U.S. Cl. .................................. 144/34 E; 144/3 D
[58] Field of Search ..................... 144/2 Z, 3 D, 34 R, 144/34 E, 309 AC; 83/694, 928

[56] References Cited

U.S. PATENT DOCUMENTS

| | | | |
|---|---|---|---|
| 3,540,501 | 11/1970 | Jonsson | 144/34 E |
| 3,817,303 | 6/1974 | Kantola et al. | 144/34 R |
| 3,854,510 | 12/1974 | Matlik | 144/34 R |
| 3,968,821 | 7/1976 | Jonsson | 144/34 R |
| 3,995,671 | 12/1976 | Wirt | 144/34 E |
| 4,022,259 | 5/1977 | Sturtz, Jr. | 144/34 E |
| 4,069,847 | 1/1978 | Wirt | 144/3 D |
| 4,069,848 | 1/1978 | Copha | 144/34 E |
| 4,088,163 | 5/1978 | Levesque | 144/34 E |

*Primary Examiner*—J. M. Meister
*Assistant Examiner*—W. D. Bray
*Attorney, Agent, or Firm*—Flynn & Frishauf

[57] ABSTRACT

A tree cutting device comprises two opposed curved knife blades, each defining a portion of a surface of revolution. Swingable arms for the curved knife blades are journalled on separate shafts which are arranged with their axes in a common plane inclined relative to the center line of the trees to be cut. The separate shafts are arranged at an angle to each other so that their axes intersect at a point between the journalling means for the arms and the intersection between the common plane for the axes of the shafts and the center line of the maximum diameter tree to be cut. Preferably, each knife blade defines a portion of a sphere. To assure proper guidance of the knives, the knife edge of each blade is located unsymmetrically relative to the thickness of the blade.

6 Claims, 6 Drawing Figures

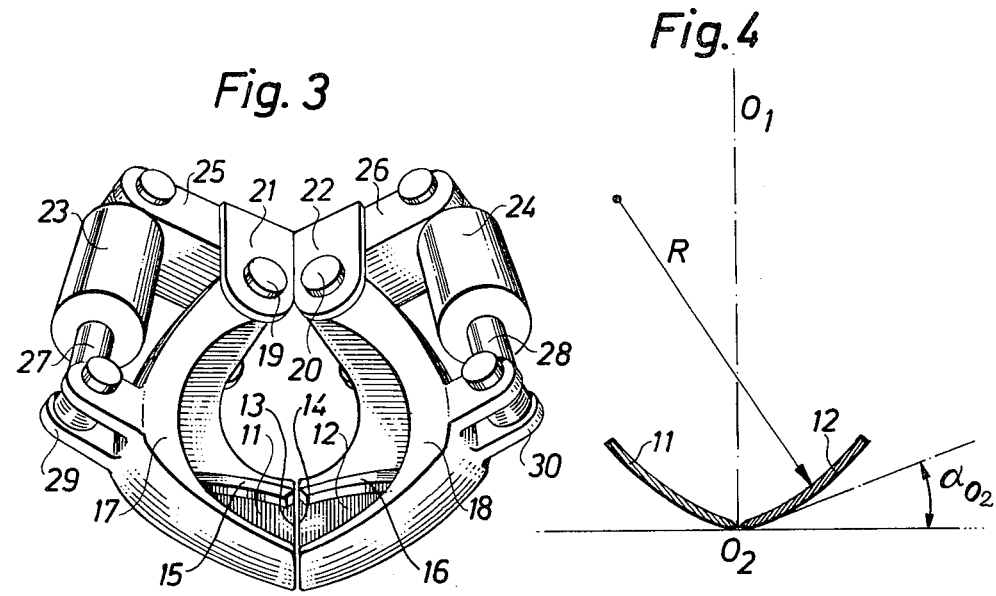
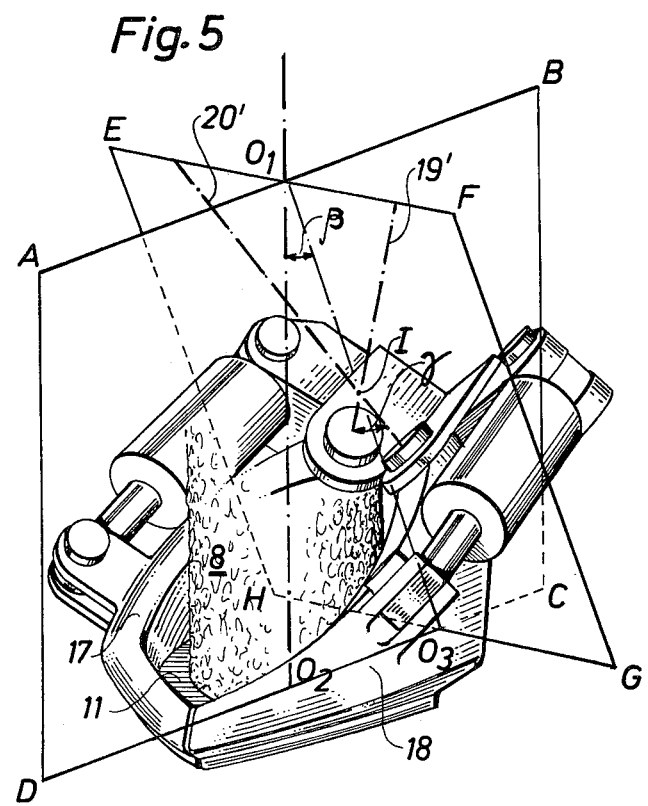

TREE CUTTING DEVICE

BACKGROUND OF THE INVENTION

This invention relates to an improvement in cutting devices for felling trees, and more particularly to such devices comprising two power operated knife blades of curved shape mounted to be swung towards and away from each other.

U.S. Pat. No. 3,540,501 discloses a device of this kind, where two knife blades are mounted on swingable arms journalled in bearings on the same shaft. Each of the blades have a cutting edge and is curved in a cross section perpendicular to the shaft to form an arc having a radius substantially corresponding to the distance from the center line of the shaft. The principal direction of each of the two cutting edges form an angle of at most 70° with the shaft. The knife blades are also curved in parallel to the edges, thus together forming a bowl, preferably a segment of a sphere.

The fact that the knife blades may be curved in two transverse directions means that they can be comparatively thin and still retain enough rigidity to transmit the considerable forces required to move the blades through a big tree trunk. Inherently, thin knife blades need lower forces to cut than do thicker knife blades, and they also inflict less damage by compression and splintering to the trunks severed.

Felling heads of this known kind have been good performers. The cutting blades have proved to withstand normal abuse for long periods in spite of cutting close to the ground and leaving very low stumps. However, in cases where sawlogs and plywood bolts are recovered from trees felled with such prior heads, the damage in the form of cracks in the butt end of the logs is not insignificant.

In the middle area of a tree, where the cutting edges move almost at a right angle to the grain, the wood is often not cut, but rather torn apart. This is because the blades, though being comparatively thin, act like wedges in their travel towards each other. It happens that this wedge action causes cylindrical annual ring sections of considerable lengths to be pulled out.

When felling large diameter trees with a device according to U.S. Pat. No. 3,540,501, the edges of the opposed curved blades will cut through the outer layers of the trunk at an acute angle to the grain. It has been observed that during this initial phase of the cutting operation, very smooth surfaces are generated and that the power required to move the blades is noticeably low. Splintering action is insignificant.

It is the object of the present invention to improve the known felling heads with opposed curved cutting blades to enable such heads to retain these good features from the initial phase all through the cutting operation.

SUMMARY OF THE INVENTION

According to the present invention, a tree cutting device comprises two opposed curved knife blades, each one defining a portion of a surface of revolution. Swingable arms for the curved knife blades are journalled on separate shafts and the separate shafts are arranged with their axes in a common plane inclined relative to the center line of the trees to be cut. The separate shafts are further arranged at an angle to each other so that their axes intersect at a point between the journalling means for the arms and the intersection between the common plane for the axes of said shafts and the center line of the maximum diameter tree to be cut.

By arranging curved blades, preferably of spherical shape, in this way, the cutting edges will move at an acute angle towards the grain of the wood substantially during the whole cut. When the edges meet, they will not meet head on but at an angle, the size of which can be chosen within fairly wide limits.

To assure proper guidance of the knives, the knife edge of each blade can be located unsymmetrically relative to the thickness of the blade by grinding the blade with one bevelled edge surface above the cutting knife edge and one bevelled edge surface below the cutting knife edge, the height of the first bevel being less than that of the second bevel. Preferably the ratio of the heights of the bevels is within the range of from about 1:3 to about 1:4.

BRIEF DESCRIPTION OF THE DRAWINGS

FIG. 3 is a front perspective view showing the device of FIG. 1 in the closed position;

FIG. 4 is a vertical section through the knife blades taken along the line $O_1$–$O_2$ of FIG. 2 and showing certain geometrical relations;

FIG. 5 is a perspective view of the device viewed obliquely from the front in a closed position and schematically showing a trunk of tree and certain lines and planes of reference.

DETAILED DESCRIPTION OF THE ILLUSTRATED EMBODIMENTS

Figure 1:
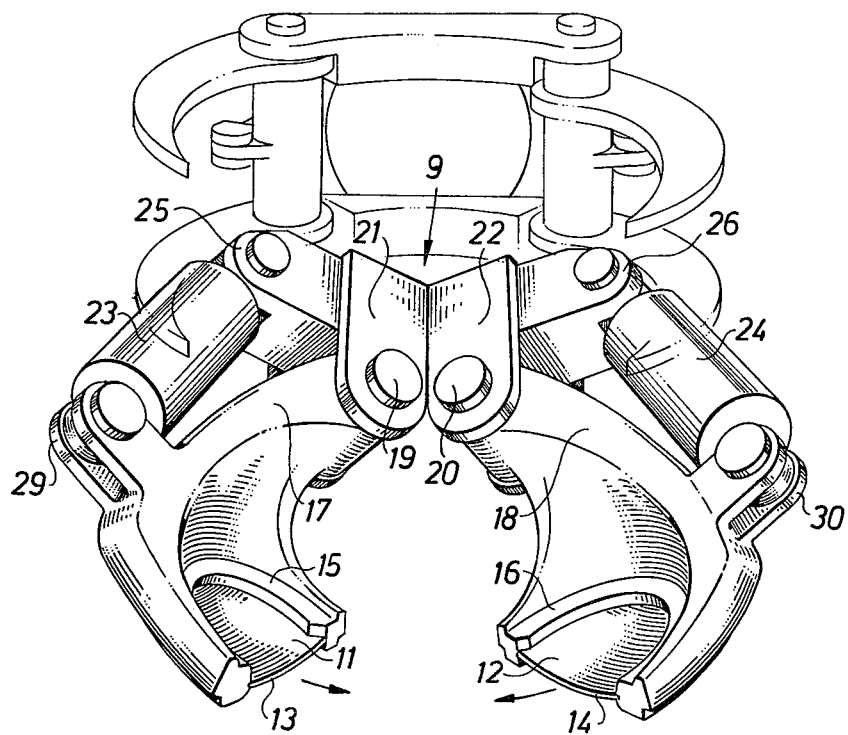
FIG. 1 is a front perspective view of the cutting device of the present invention in the opened position, a cooperating tree holder being shown by phantom lines.

The tree cutting device shown in the drawings is of the general type normally mounted at the end of a crane boom, which in turn is mounted on a vehicle supplying the power and housing the control means necessary for operation of the device. The mounting of the cutting device on a crane and the means for moving the device in relation to the boom are described in detail in the above-mentioned U.S. Pat. No. 3,540,501 and, therefore, will not be described here. The same applies to the tree gripper shown in phantom lines in FIG. 1 and which is adapted to hold a tree during a cutting operation and to directionally lay down the trunk on the ground thereafter.

Figure 2:
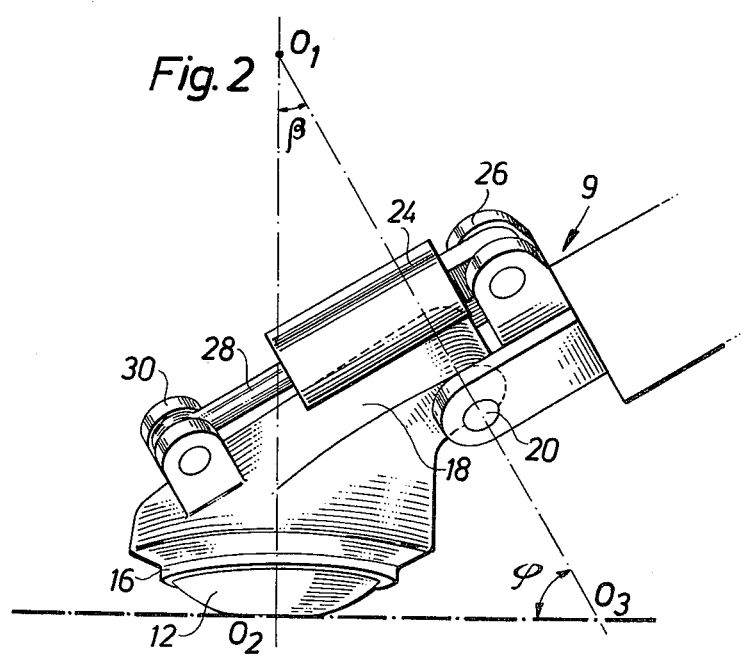
FIG. 2 is a side view of the arrangement of FIG. 1 including certain geometric lines of reference.

Referring to FIGS. 1-3, the cutting tools or knife blades 11,12 are substantially semicircular steel plates which are curved to form a bowl when their cutting edges 13,14, respectively, are in contact with each other. The semicircular rear edge portions of the blades 11,12 are secured in any suitable way to the lower sides of correspondingly arcuate frame members 15,16, respectively. When the cutting edges 13,14 are in contact, as shown in FIG. 3, the frame members 15,16 form a closed ring determining the maximum thickness of a tree to be cut.

The frame members 15,16 are fixed to respective arms 17,18 which are swingably journalled on respective separate shafts 19,20 held by respective brackets 21,22. Brackets 21,22 are mounted on a frame structure 9, which is carried by a crane boom or the like, not shown.

The arms 17,18 and, thus, the knife blades 11,12 can be swung towards and away from each other by means of double-acting hydraulic cylinders 23,24 with respective piston rods 27,28. The cylinders 23,24 and rods 27,28 are linked respectively to ears 25,26 on the frame structure 9 and to ears 29,30 fixed to an outer portion of the respective arms 17,18 or to the outside of the frame members 15,16.

Referring to FIG. 5, the axes 19' and 20' of the shafts 19,20 are located in a common plane E, F, G, H, which is inclined at an angle $\beta$ to the vertical centerline $O_1-O_2$ (FIGS. 2 and 5) of the cutting device, also coinciding with the center line of the maximum tree 8 to be cut. Letters A, B, C, D in FIG. 5 indicate a plane of symmetry through the cutting device and the centerline $O_1-O_2$. The shafts 19,20 are arranged at an angle to each other such that their axes 19', 20' define an angle $\gamma$. The axes 19', 20' intersect at a point I located between the shafts 19,20 and the intersection between the centerline $O_1-O_2$ and the plane E, F, G, H.

Cutting blades according to the invention constitute portions of a surface of revolution having its center along the axes 19',20' of the respective shaft 19,20. The knife blades may each preferably be a segment of a sphere, but a variety of shapes are possible and fall within the scope of the invention.

Provided that the surface of revolution is a sphere, it can be realized by observing in FIG. 5 that the axis 19' coincides with a radius for the sphere of which cutting blade 11 is a portion. It can also be realized that the center of this sphere is located where the axis 19' intersects the horizontal line E F. Correspondingly, the center of the sphere containing cutting blade 12 is located where axis 20' intersects line E F. The shape of the cutting blades is determined by the intersection of these two spheres.

FIG. 4 illustrates the cutting geometry obtained when the above-described measures are taken. The cutting blades 11,12 will not meet head on as in the known tree cutting devices with curved blades. This means that the grain of the wood in the central part of the tree can be cut at an angle the size of which can be varied within wide limits. A small departure from the straight perpendicular relationship in the finishing phase of a cut with known felling heads is beneficial both for splintering and power. Further, the cut becomes substantially smoother when the blades cut the grain at an angle, and this also means lower cutting force and less stress in the blades.

Figure 6:
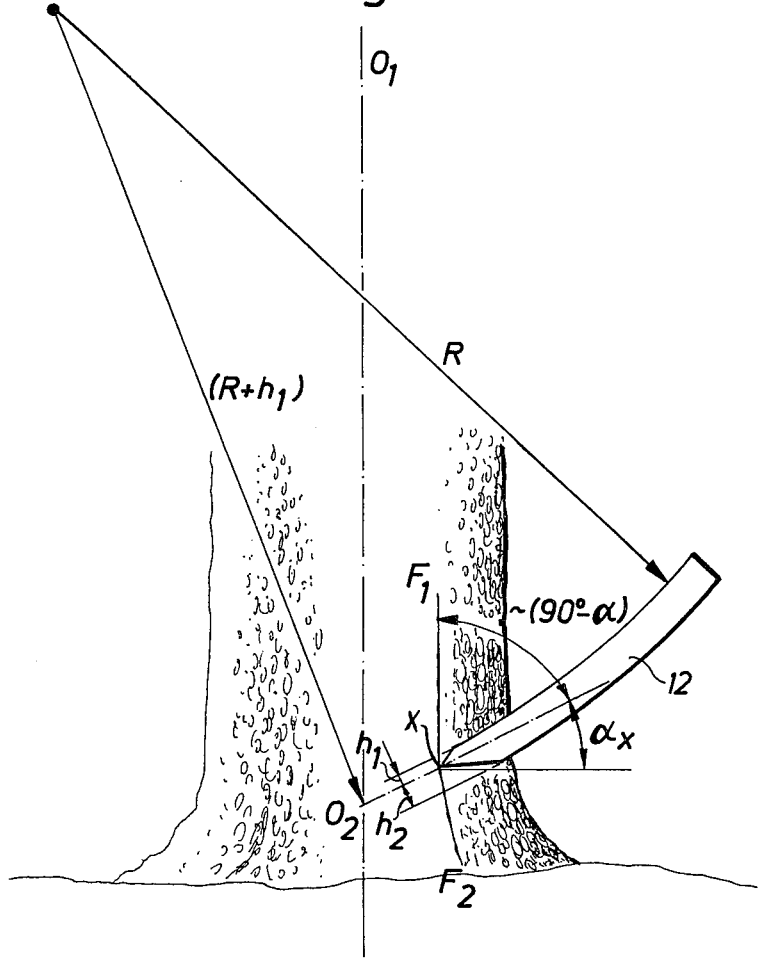
FIG. 6 schematically shows a section of a knife blade and a tree to be cut and the geometrical relations therebetween.

In FIG. 6, there is shown with a dash-dotted line an ideal cutting path for a schematically shown cutting blade 12. The angle between the tangent of the cutting path at the point x and the horizontal plane through this point is denoted $a_x$. During its path of movement the knife, or, more precisely, the tangent of the cutting path, forms an angle less than 90° (90 $-$ $a_x$) with a tree grain $F_1F_2$. Preferably, the angle between the cutting line of the knife blade and the center line (i.e., direction of the grain) of the tree to be cut never exceeds 85° during a cut, and is substantially 75° at the end of a cut. If the knife has a symmetric edge, it would not follow the upwardly curved dash-dotted line. In order to counteract this downwardly guiding force imparted to the cutting blade by the tree during cutting, the edge of the cutting blade can, according to a further feature of the present invention, by unsymmetrically shaped, or ground, as shown in FIG. 6, with its edge located above the middle plane of the blade, such that there is formed an upper bevelled edge portion having a height $h_1$ and a lower bevelled edge portion having a height $h_2$, with $h_2$ being greater than $h_1$. Preferably, the ratio of $h_1$ to $h_2$ is within the range of from about 1:3 to about 1:4.

The heights $h_1$ and $h_2$ are measured radially with respect to the center of the curved blade shape between the edge of the blade and the respective upper and lower sides of the blade. This arrangement means that the grain at the upper side of the blade must be deformed only the distance $h_1$. As a result, the splitting of the trunk of the tree becomes less on the upper side, which is desired than on the lower side which is the stump left in the ground.

In the embodiment of the invention illustrated in the figures the values chosen for the angles, $\alpha$, $\beta$, and $\gamma$ are respectively 15°, 35° and 60°. Though these values constitute a good combination, many other combinations are possible. However, it is preferable to keep the angle $\alpha$ within the range from about 10° to about 20°. While the invention has been described above with respect to a specific embodiment, various modifications and alterations can be made thereto within the spirit and scope of the invention as defined in the appended claims.

I claim:
1. A tree cutting device, comprising:
   first and second separate shafts;
   a pair of swingable arms having respective journalling means coupled to respective ones of said separate shafts so that said arms are swingably journalled on respective ones of said separate shafts which define respective swinging axes for said arms, each arm including a knife blade holder;
   two curved knife blades mounted respectively to said knife blade holders of said arms;
   power means coupled to said arms for moving said arms and said knife blades towards and away from each other;
   each knife blade defining a portion of a surface of revolution, the center line of which coincides with the swinging axis of the respective arm on which the knife blade is mounted;
   the axes of said separate shafts lying in a common plane that is inclined towards the center line of the trees to be cut; and
   said separate shafts being arranged at an angle to each other so that their axes intersect at a point between the journalling means for said arms and the intersection between the common plane for said axes of said separate shafts and the center line of the maximum diameter tree to be cut.

2. A tree cutting device according to claim 1, wherein each knife blade defines a portion of a sphere.

3. A tree cutting device according to claim 1, wherein the angle between a cutting line of a knife blade and the center line of the trees to be cut never exceeds 85° during a cut.

4. A tree cutting device according to claim 3, wherein said angle is substantially 75° at the end of a cut.

5. A tree cutting device according to claim 1, wherein the cutting knife edge of each blade is located unsymmetrically relative to the thickness of the blade, each blade having a first bevelled edge portion above the cutting edge and a second bevelled edge portion below the cutting edge, the height of the first bevelled edge portion being less than the height of the second bevelled edge portion.

6. A tree cutting device according to claim 5, wherein the ratio of the height of the first bevelled edge portion to the height of the second bevelled edge portion is within the range of from about 1:3 to about 1:4.

* * * * *